Nov. 4, 1952 — R. F. WHITE — 2,616,185
SPACING GAUGE ASSEMBLY FOR MILL ROLLERS
Filed May 26, 1950 — 3 Sheets-Sheet 1
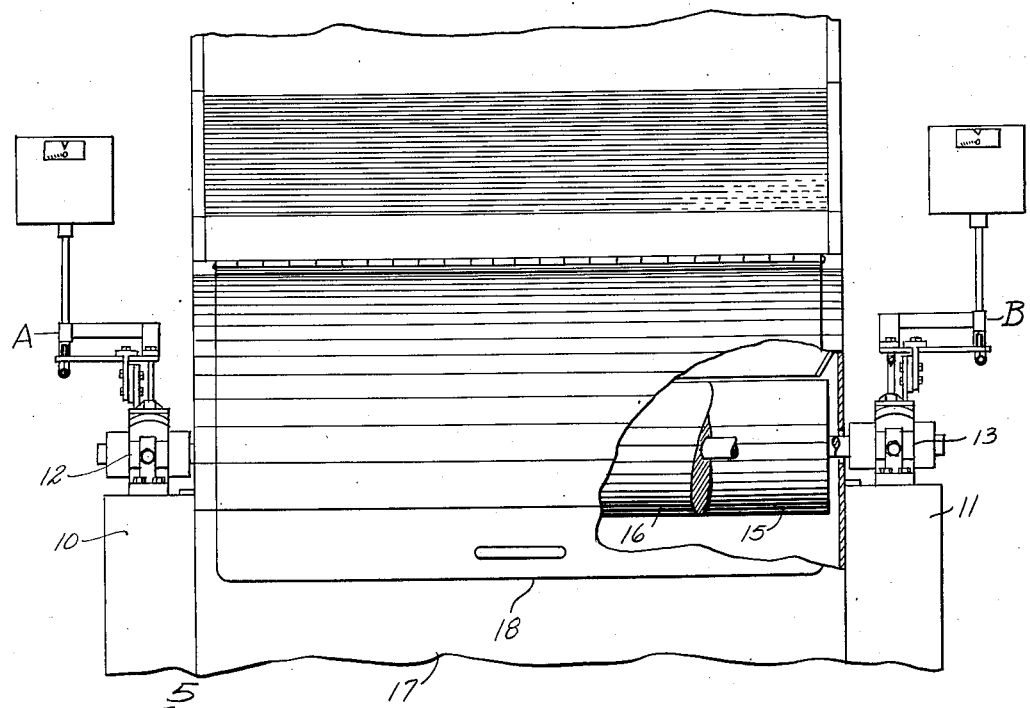
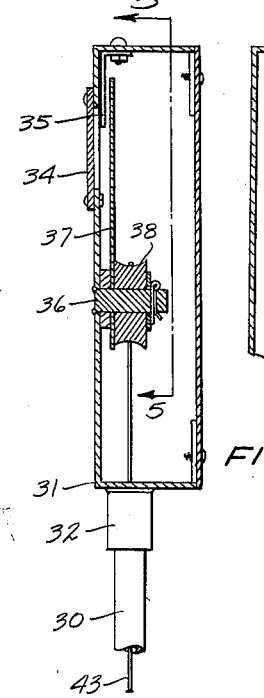
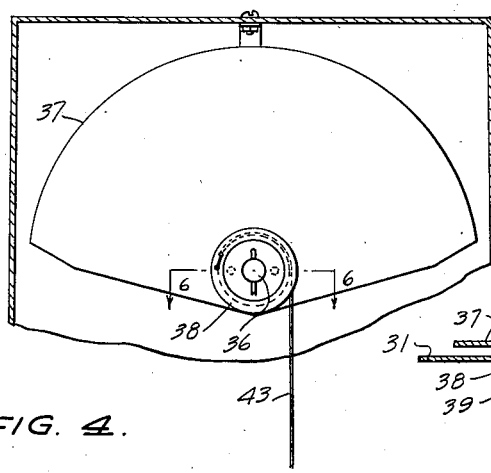
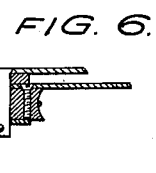
INVENTOR.
ROY F. WHITE,
BY
McMorrow, Berman + Davidson
ATTORNEYS.

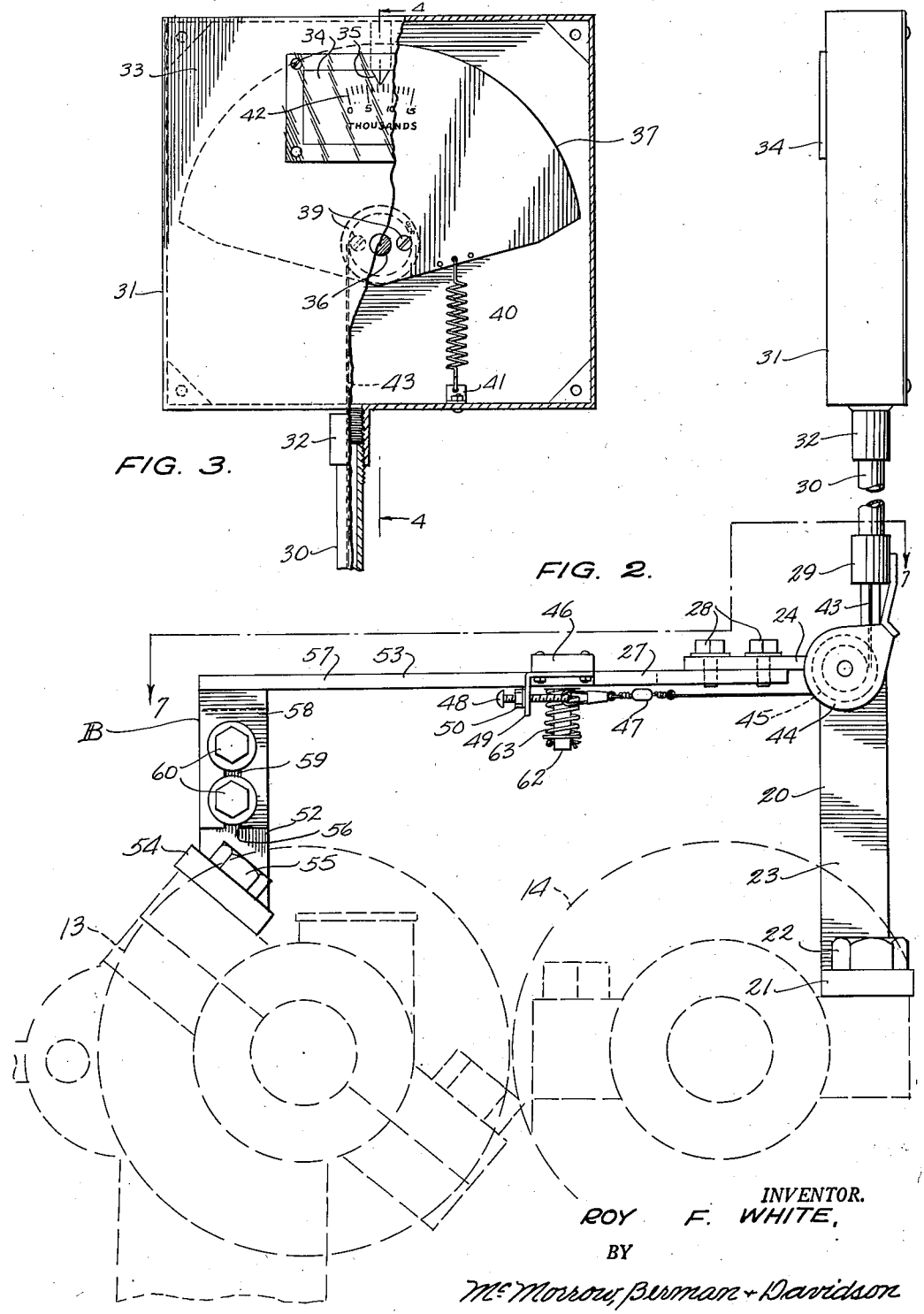

Nov. 4, 1952  R. F. WHITE  2,616,185
SPACING GAUGE ASSEMBLY FOR MILL ROLLERS
Filed May 26, 1950
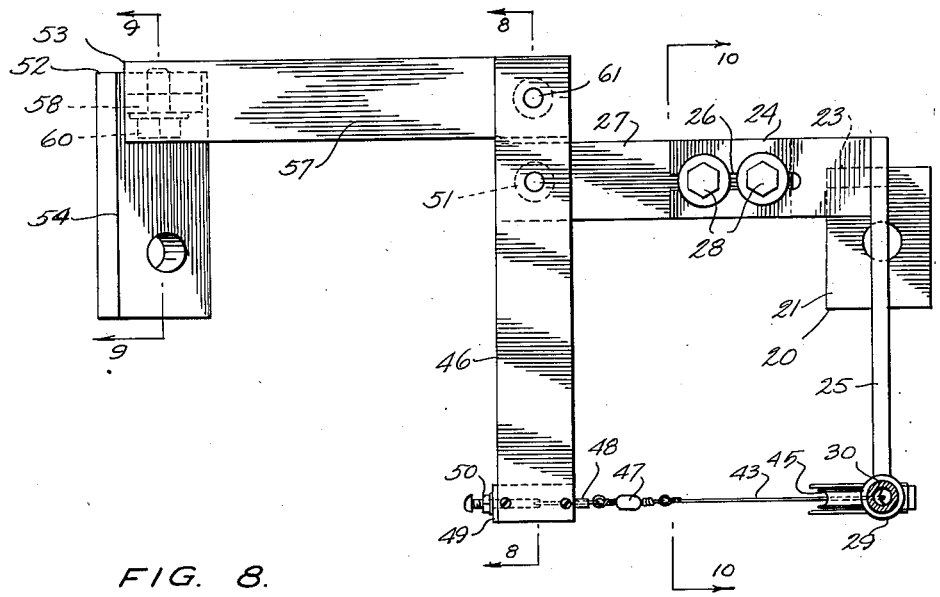
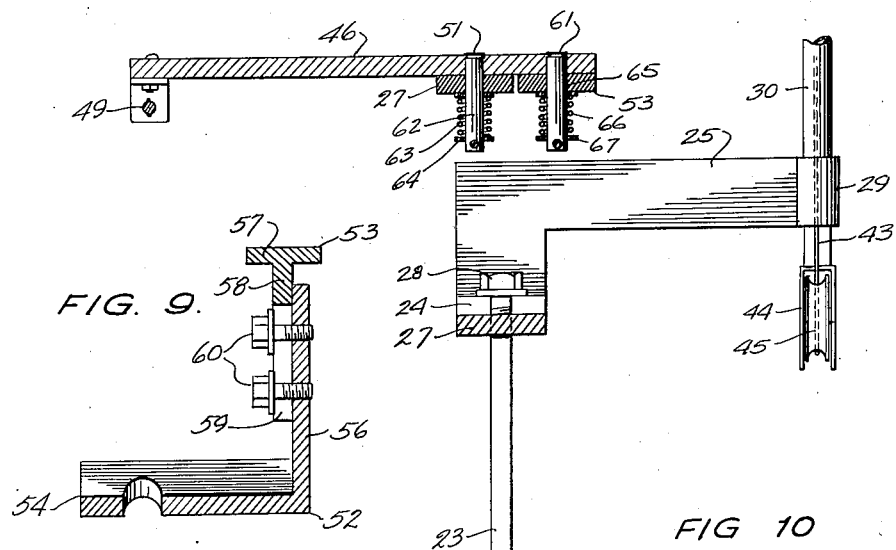
INVENTOR.
ROY F. WHITE,
BY
McMorrow, Berman & Davidson
ATTORNEYS.

Patented Nov. 4, 1952

2,616,185

UNITED STATES PATENT OFFICE 2,616,185

SPACING GAUGE ASSEMBLY FOR MILL ROLLERS

Roy F. White, Madisonville, Tenn.

Application May 26, 1950, Serial No. 164,495

4 Claims. (Cl. 33—182)

1

This invention relates to gauge assemblies and more particularly to a gauge assembly for accurately indicating the spacing between a pair of complementary mill rollers.

It is among the objects of the invention to provide a gauge assembly which can be permanently mounted on a mill and connected to mill roller bearings to continuously and accurately indicate the spacing between two complementary mill rollers, which includes two units disposed one unit at each end of a pair of rollers so that the spacing between the rollers can be maintained uniform from one end to the other end of the pair of rollers, which can be easily and accurately calibrated in place on the mill, and which is simple and durable in construction, economical to manufacture and install, and positive and accurate in operation.

Other objects and advantages will become apparent from a consideration of the following description and the appended claims in conjunction with the accompanying drawings wherein:

Figure 1 is a front elevational view of a fragmentary portion of a mill showing a gauge assembly illustrative of the invention mounted thereon, a portion of the mill being broken away to show the arrangement of the mill rollers therein;

Figure 2 is an elevational view of one unit of the gauge assembly;

Figure 3 is a front elevational view of an indicating instrument constituting an operative component of the gauge assembly unit illustrated in Figure 2, a portion of the instrument being broken away and shown in cross section to better illustrate the construction thereof;

Figure 4 is a cross sectional view on the line 4—4 of Figure 3;

Figure 5 is a cross sectional view on the line 5—5 of Figure 4;

Figure 6 is a cross sectional view on the line 6—6 of Figure 5;

Figure 7 is a cross sectional view on the line 7—7 of Figure 2;

Figure 8 is a cross sectional view on the line 8—8 of Figure 7;

Figure 9 is a cross sectional view on the line 9—9 of Figure 7; and

Figure 10 is a cross sectional view on the line 10—10 of Figure 7.

With continued reference to the drawings, the mill, fragmentarily illustrated in Figure 1, has a frame providing two side members 10 and 11. A movable bearing 12 is mounted on the frame side member 10 and a corresponding movable bearing

2

13 is mounted on the side member 11. A fixed bearing, not illustrated, is mounted on the side member 10 adjacent the movable bearing 12 and a corresponding fixed bearing, indicated at 14 in Figure 2, is mounted on the side member 11 adjacent the movable bearing 13. A roller 15 is journaled at its ends in the two fixed bearings and a complementary roller 16 is journaled at its ends in the two movable bearings 12 and 13, and is operatively opposed to the roller 15. The mill includes a cover 17 enclosing the rollers 15 and 16 and this cover is provided with an access opening closed by a hinged door 18 which can be raised to provide access to the rollers for adjustment and repair.

As the mill may be of well known construction, a more detailed description is considered unnecessary for the purposes of the present disclosure.

The gauge assembly of the present invention comprises two units A and B disposed at substantially opposite ends of the pair of rollers 15 and 16 and substantially identical in construction except that one is right hand and the other is left hand.

As the units A and B are substantially identical in construction and operation, a detailed description of one only is considered sufficient for the purposes of the present disclosure and the unit B has been selected for such detailed illustration and description.

The unit B comprises a first bracket 20 comprising an apertured base or foot 21 secured to the fixed bearing 14 by a bearing cap bolt 22 and a standard 23 extending perpendicularly upwardly from the foot 21. Two arms 24 and 25 are secured to the upper end of the standard 23 opposite the foot 21, the two arms being each secured to the upper end of the standard at one end of each arm and being disposed substantially at right angles to each other and perpendicular to the standard. The bracket 20 is mounted on the bearing 14 so that the arm 24 extends toward the corresponding movable bracket 13 and the arm 25 extends in a direction away from the adjacent end of the roller 15.

The arm 24 is provided with a longitudinally extending slot 26 opening to the end of the arm remote from the bracket standard 23 and a bar 27 is secured to the arm 24 by bolts 28 which extend through the slot 26 and are threaded into tapped holes in the bar 27. The bar 27 is thus longitudinally adjustable relative to the arm 24.

The arm 25 is provided at its end remote from the standard 23 with a socket or eye 29 and a tubular stem 30 is secured at one end in the socket 29 and extends upwardly from the arm 25 substantially perpendicularly to the arm. A hollow rectangular housing 31 is mounted on the upper end of the stem 30 opposite the end of the stem attached to the bracket arm 25, the housing being provided with a hollow internally screw threaded fitting 32 which receives the internally screw threaded upper end of the stem 30.

The housing 31 is provided with a removable cover 33 having therein an elongated window 34 provided with an indicating point or marker 35 located substantially at the mid-length location of the upper edge of the window. A shaft 36 is journaled in the housing adjacent the center of the cover 33 and an indicator 37 in the form of a sector shaped plate is secured on the shaft 36 so that the axis of the shaft is substantially coincident with the center of curvature of the arcuately curved edge of the plate. A sheave 38 is mounted on the shaft 36 in contact with the side of the indicator plate 37 remote from the cover 33 and the indicator plate is secured to this sheath by suitable means, such as the screws 39.

A tension spring 40 is connected at one end to the indicator plate 37 at a location spaced from the shaft 36 and is connected at its other end by a clip 41 to the bottom wall of the housing 31 so that this spring acts to resiliently move the indicator plate in one direction in the housing. The indicator plate carries a dial 42 laid off to indicate thousandths of an inch spacing between the two rollers and having at one end a zero mark to indicate the condition in which the two rollers are in contact with each other and the spring 40 acts to move the indicator plate 37 in a direction to bring the zero mark of the dial 42 to or past the indicating pointer 35.

A flexible strand 43 is wound at one end on the sheath 38 and extends from this sheave downwardly through the tubular stem 30.

A fork 44 is secured to the end of the stem 30 engaged in the socket 29 and a guide sheave 45 is journaled in this fork in position such that one side of the guide sheath is substantially tangent to the longitudinal center line of the tubular stem 30.

A lever 46 is pivotally mounted intermediate its length on the bar 27 at the end of the bar remote from the bracket standard 23 and this lever is disposed substantially parallel to the arm 25 with one end substantially opposite the bottom end of the stem 30. The strand 43 is carried under the guide sheave 45 and is adjustably connected at its other end to the lever 46 at the end of the lever opposite the stem 30. A swivel joint 47 is connected at one end to the lever adjacent end of the strand 43 and the other end of this swivel joint is connected to one end of a screw 48 threaded through a screw threaded aperture in a bracket 49 carried by the lever 46 so that the tension on the strand 43 can be adjusted by turning the screw 48. The screw is locked in adjusted position by a lock nut 50 threaded onto the screw and bearing against the outer side of the bracket 49.

With this arrangement, when the lever 46 is moved about its pivotal connection 51 with the bar 27 in a direction such that its end to which the strand 43 is connected is moved away from the tubular stem 30, the strand is pulled and will unwind off of the sheave 38 and move the indicator plate 37 in the direction opposite that in which the indicator plate is moved by the spring 40. This pull on the strand 43 will thus move the dial 42 past the indicator point 35 in a direction from the zero mark toward the opposite end of the dial.

In order to impart the indicated movement to the lever 46 a second bracket 52 is mounted on the movable bearing 13 and connected to the lever 46 by a link 53.

The lever 46 has an apertured base or foot 54 secured to the movable bearing by a bearing cap bolt 55 and includes a standard 56 projecting from the foot 54 substantially perpendicular to the latter. The faces of the foot 54 are inclined relative to the edges of the standard 52 at an angle such that when the foot is mounted on the inclined bearing cap of the movable bearing the standard 56 will be substantially vertically disposed.

The link 53 comprises an elongated bar 57 and a lug 58 secured to one end of the bar and projecting substantially perpendicularly from the bar. The lug 58 is provided with an elongated slot 59 opening to the end of the lug remote from the link bar 57 and this lug is secured to the standard 56 by bolts 60 extending through the slot 59 and threaded into tapped holes in the standard so that the lug is longitudinally adjustable relative to the standard.

At its end opposite the lug 58 the lever bar 57 is pivotally connected to the lever 46 by a pivotal connection 61 located at the side of the pivotal connection 51 opposite the strand connected end of the lever. The pivotal connection 51, as particularly illustrated in Figure 8, comprises a pin 62 secured at one end in an aperture in the lever 46 and extending through an aperture in the bar 27, a compression spring 63 surrounding the pin at the side of the bar 27 opposite the lever 46 and an abutment washer 64 secured on the pin at the end of the spring remote from the bar 27. The pivotal connection 61 comprises a similar pin 65 secured in an aperture in the lever 46 and extending through an aperture in the link 53, a compression spring 66 surrounding the pin at the side of the link 53 remote from the lever 46 and an abutment washer 67 secured on the pin at the end of the spring 66 remote from the link 53.

With the above described construction, when the movable bearing 13 is moved toward or away from the fixed bearing 14 to change the spacing between the corresponding ends of the rollers 15 and 16, the lever 46 will be swung about its pivotal connection 51 and will correspondingly tighten or slacken the strand 43 imparting a corresponding pivotal movement to the indicator plate 37 and moving the dial 42 past the indicating point 35 so that the dial will always indicate in thousandths of an inch the exact spacing or clearance between the two rollers.

The distance between the axes of the pivotal connections 51 and 61, the distance between the axis of the pivotal connection 51 and the axis of the adjusting screw 50 and the diameter of the sheave 38 are mathematically predetermined in accordance with the spacing of the indicating marks of the dial 42 so that a difference in roller spacing of one thousandths of an inch will cause a dial movement of exactly one space, and these distances are so proportioned that the relative movement of the two rollers is greatly multiplied when converted to movement of the dial plate 37 so that the dial spaces are large enough that the dial can be easily read.

In order to calibrate the gauge, the rollers are adjusted to a predetermined spacing by means of a feeler gauge inserted between the two rollers and the screw 48 is then adjusted until the predetermined mark on the dial 42 coincides with the indicating pointer 35. By this means, any variation in the length of the strand 43 and any displacement of the various supporting components of the gauge can be accurately compensated.

In adjusting the spacing between the two rollers the movable bearings at the two ends of the pair of rollers will be adjusted until both of the gauges are brought to the same reading. The exact spacing or clearance between the two rollers will then be accurately known and it will also be known that this spacing or clearance is uniform from one end to the other end of the pair of rollers.

When the gauge assembly is used on the rollers of a flour mill, flour of a predetermined fineness can be ground and the efficiency of the mill can be maintained since the rollers can be accurately adjusted to pass the maximum amount of grain without overheating while producing flour of the desired fineness. The gauge assembly may be used on various types of roller mills, such as flour mills, paper mills, metal rolling mills and printing presses where it is necessary to control the spacing between the rollers within extremely narrow limits.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a mill frame, a pair of fixed bearings and a pair of adjustably movable bearings mounted on said frame, a first roller journaled in said fixed bearings and a second roller journaled in said movable bearings and opposed to said first roller, a gauge assembly indicating the space between said rollers and comprising two gauge units disposed one at each end of said pair of rollers and each comprising a first bracket mounted on the corresponding fixed bearing, a second bracket mounted on the corresponding movable bearing, two arms mounted on said first bracket and diverging from each other in a direction away from said first bracket, a tubular stem secured at one end to one of said arms and extending therefrom, a housing mounted on the other end of said stem, an indicator pivotally mounted in said housing, a guide carried by said one arm at said one end of the stem, a lever pivotally mounted on the other of said arms, a flexible strand secured at one end to said indicator and extending through said stem and over said guide and secured at its other end to said lever at a location spaced from the pivotal connection between said lever and said other arm, whereby movement of said lever will move said indicator in one direction in said housing, spring means acting between said indicator and said housing for moving said indicator in the opposite direction, and a link connected at one end to said lever and at its other end to said second bracket for moving said lever in response to movement of said movable bearing relative to said fixed bearing.

2. In combination with a mill having a frame, fixed and movable bearings mounted on said frame with a movable bearing adjacent each fixed bearing, a first roller journaled at its opposite ends in fixed bearings and a second roller journaled at its opposite ends in movable bearings and operatively opposed to said first roller, means indicating the spacing between said rollers comprising two gauge units disposed one unit at each end of the pair of rollers and each comprising a first bracket mounted on the corresponding fixed bearing, a second bracket mounted on the corresponding movable bearing, a lever pivotally mounted on said first bracket, a link connecting said second bracket to said lever at a location spaced from the pivotal connection between said lever and said first bracket, a distance indicating instrument mounted on said first bracket, and means connecting said distance indicating instrument to said lever at a location spaced from the pivotal connection between said lever and said first bracket and said link whereby movement of said movable bearing relative to said fixed bearing will operate said distance indicating instrument.

3. In combination with a support, a fixed bearing mounted on said support and a movable bearing mounted on said support for movement toward and away from said fixed bearing, means for indicating the position of said movable bearing relative to said fixed bearing comprising a first bracket mounted on said fixed bearing, a second bracket mounted on said movable bearing, a tubular stem secured at one end to said first bracket, a distance indicating instrument mounted on the other end of said stem, a lever pivotally mounted intermediate its length on said first bracket, tension means extending along said stem and connecting one end of said lever to said instrument, and a link connecting said second bracket to the other end of said lever.

4. A gauge for indicating the distance between bearings of opposed rollers in a mill comprising a pair of spaced apart brackets adapted to be mounted on relatively movable bearings, a lever pivotally mounted intermediate its length on one of said brackets, a link connecting the other of said brackets to said lever at a location spaced from the pivotal connection between said one bracket and said lever, a distance indicating instrument mounted on said one bracket, a flexible element extending from said instrument, and means adjustably connecting said flexible element to said lever at a location spaced a different distance from said pivotal connection than the distance between said pivotal connection and the connection between said lever and said link.

ROY F. WHITE.

REFERENCES CITED

The following references are of record in the file of this patent:

UNITED STATES PATENTS

| Number | Name | Date |
| --- | --- | --- |
| 1,559,230 | Eccles | Oct. 27, 1925 |
| 1,687,192 | Barber | Oct. 9, 1928 |
| 2,050,725 | Messinger | Aug. 11, 1936 |
| 2,054,530 | Williams | Sept. 15, 1936 |

FOREIGN PATENTS

| Number | Country | Date |
| --- | --- | --- |
| 456,305 | Great Britain | Nov. 6, 1936 |